(12) United States Patent
Roth

(10) Patent No.: US 8,587,641 B2
(45) Date of Patent: Nov. 19, 2013

(54) AUTOSTEREOSCOPIC DISPLAY SYSTEM

(76) Inventor: Alexander Roth, Sudbury, MA (US)

( * ) Notice: Subject to any disclaimer, the term of this patent is extended or adjusted under 35 U.S.C. 154(b) by 0 days.

(21) Appl. No.: 13/314,350

(22) Filed: Dec. 8, 2011

(65) Prior Publication Data

US 2012/0224038 A1 Sep. 6, 2012

Related U.S. Application Data

(60) Provisional application No. 61/464,514, filed on Mar. 4, 2011.

(51) Int. Cl.
*H04N 9/47* (2006.01)
*H04N 13/04* (2006.01)

(52) U.S. Cl.
USPC .................................................. 348/55

(58) Field of Classification Search
USPC .................................................. 348/55
See application file for complete search history.

(56) References Cited

U.S. PATENT DOCUMENTS

| | | | | |
|---|---|---|---|---|
| 2008/0246753 A1* | 10/2008 | Amroun et al. | ............... | 345/214 |
| 2008/0316596 A1* | 12/2008 | Cha et al. | ............... | 359/463 |
| 2010/0238270 A1* | 9/2010 | Bjelkhagen et al. | ............ | 348/45 |
| 2010/0259604 A1* | 10/2010 | Surman | ............... | 348/54 |
| 2011/0248911 A1* | 10/2011 | Si | ............... | 345/156 |

* cited by examiner

*Primary Examiner* — Mehrdad Dastouri
*Assistant Examiner* — Jeremaiah C Hallenbeck-Huber

(57) ABSTRACT

An autostereoscopic display system comprised of an array of vertically oriented narrow light sources and a spatial light modulator, (SLM), disposed between the lights and viewers, whereby light rays originating from selected lights pass through the SLM in direct lines to viewers eyes The lights are sequentially flashed, sending light through the SLM where selected full height narrow vertical picture lines, VPL's, are made briefly transmissive while the remainder of the SLM remains dark, projecting vertically oriented sheets of light through selected VPL's toward selected eyes. The light sheets are sufficiently narrow as to enter a left or right eye but not both, The process rapidly repeats for all VPL's and all array lights, alternating between right/left SLM scenes each projected into appropriately selected eyes resulting in a 3D image.

12 Claims, 9 Drawing Sheets

AUTOSTEREOSCOPIC DISPLAY SYSTEM

This application claims priority from provisional application No. 61/464,514 filed on date Mar. 4, 2011.

USPTO SEARCH CLASSES AND SUB-CLASSES SEARCHED

353/7
348/42, 348/51, 348/54, 348/55,
349/15
359/458
Additionally: 348/56, 348/59, 348/40.

BACKGROUND OF THE INVENTION 3D display systems might be broadly grouped as those requiring visual viewing aids or those that do not. The ones not requiring any viewing aids are sometimes referred to as autostereoscopic displays. The autostereoscopic systems may be further classified as stereoscopic systems, holographic systems, multiviewer systems, viewer adaptive systems, etc. The stereoscopic systems, generally referenced as autostereoscopic simply present two views, a left-eye view and a right-eye view to the left and right eyes respectively. Holographic systems present a sufficient number of views, not only different for each eye, but enough views from different directions that the viewer may roam around the image region and see the imaged object from different positions. The holographic systems may provide holographic views with parallax only in the horizontal direction, or in both the horizontal and vertical directions. Multiviewer systems may be grouped as two types: (1) a fixed viewing system that provides fixed viewing positions for each of several viewers and (2) an adaptive system that tracks the viewer positions so that viewers are not limited to fixed positions in the viewing area.

A Brief Listing of Various Types of 3D Display Systems
I—VIEWING AIDS REQUIRED
Polarized Systems
   Polarized passive glasses
TIME SEPARATION SYSTEMS
   Active glasses with alternating shutters
II—Viewing Aids not Required
INTEGRATED SCREEN CONFIGURATION
   lenticular lenses with diffused backlight
   parallax barrier with diffused backlight
DISPLAYS WITH Separated Backlight (A)
   Small multi-backlight sources illuminating a large lens which re-directs images into small viewing zones for individual eyes: Field (image) sequential **
DISPLAYS WITH SEPARATED BACKLIGHT (B)
   Array of vertical line light sources
   Vertical image-line sequential **
DISPLAYS CONTAINING A LARGE NUMBER OF LIGHT OR IMAGE SOURCES EQUAL TO FULL RESOLUTION
   Hologram like
REFLECTION DISPLAY:
   Lit from front or side **
HOLOGRAPHIC
   Horizontal parallax only
   Horizontal plus vertical parallax
** With optional head/eye tracking to eliminate blank or pseudoscopic viewing zones.

The invention to be described herein fits into the above mentioned class:
DISPLAYS WITH SEPARATED BACKLIGHT (B)
   Array of vertical line light sources.
   Vertical image-line sequential
   A configuration which would be most suitable for in-home television would be:
autostereoscopic,
multi-viewer, and
adaptive (head/eye tracking)

Creating a 3D display system that produces a near realistic view of a scene remains an elusive achievement. Many factors come into play and based on the technology available at any point in time, compromises are necessary. Systems requiring viewing aids have encountered strong market rejection. Parallax barrier systems place restrictions on viewer position. Brightness and image fidelity at reasonable cost are difficult to achieve with most of the current approaches.

The techniques to be described herein describe an approach which overcomes the deficiencies of the systems mentioned above. This invention uses an array of light sources behind an SLM, spatial light modulator, such as a transparent LCD image panel. Separate, narrow vertical columns of the image are selected, and together with selected light sources in the light-source array, cause vertical sheets of light rays to be projected toward the viewer. An entire vertical picture line is thus projected to be visible to any eyeball (generally a single eyeball) within the vertical plane containing the selected LCD column and the selected light source. Because a relatively large number of light sources are employed in the light array, it is possible to direct selected narrow picture columns, a small number at a time, with very high precision towards the individual viewers. The individual image columns are projected a few, generally one or two at a time, in succession, at high speed into each viewing eyeball so that all columns in the scene reach each eyeball in less than a persistence-of-vision interval of time and so a smooth representation of the scene in achieved.

Thus, with the required number of light sources, careful dynamic alignment between the light sources, the selected vertical LCD columns and a viewing eyeball, it becomes possible to achieve the precision and brightness required to overcome many of the problems with other autostereoscopic display systems.

Numerous patents disclose approaches to autostereoscopic displays based on flat screens which are physically integrated with lenticular lenses or with barrier shutters or both in order to direct separated images to the left and the right eyes. These systems are very limited in their ability to provide multi-viewer capability with high resolution images free of pseudoscopic zones and blank zones. Integrated, flat screens are also limited in their ability to provide multi-viewer tracking A better approach than integrated screens is achieved by using displays where separate light sources are arranged to produce controlled directional images. Discounting elaborate holographic displays and considering autostereoscopic (left/right only) image displays, autostereoscopic displays have been achievable, in one approach, using means to rear project entire images through large lenses into the viewer's eyes. The image to be projected may be formed in an SLM, either behind the projection lens, or directly in front of the lens, and with proper image or eye placement, the viewed image fills the entire lens. Tracking is achievable by forming the image at different places on the SLM image panel, or by moving the SLM light source so as to maintain the focus point of the lens in the viewing eye. This approach requires, for TV, large lenses and a very deep projection system as well as an image screen which must produce high resolution images on small regions of the active image area. Systems of the type mentioned here are disclosed, for example, in patents such as U.S. Pat. No. 5,132,839, U.S. Pat. No. 7,753,529, U.S. Pat. No. 6,215,590, U.S. Pat. No. 6,172,807 and many others.

The problems associated with autostereoscopic systems of the type mentioned above, which have prevented commercial application, are avoided with the approach used in the presently disclosed invention. Lenses are avoided and the depth of the display device is kept at a few inches. The goal of;
(1) producing a high resolution autostereoscopic image using the full resolution capability of the image panel, and
(2) producing autostereoscopic images free of pseudoscopic and blank zones, and
(3) accommodating multiple viewers with bright images may be realized using the approach disclosed herein.

The main underlying principle of this invention is based on the projection of selected vertical picture columns from the image panel, a small number at a time, into viewer's eyes with high positional precision. Precise projection aiming results from using selected light sources from an array of sources and selected screen image columns where the lights are dynamically chosen for alignment with the viewer's eyes and the columns. Eye tracking technology is employed to provide the control signals to maintain the alignment.

The discussion to follow will primarily focus on a basic configuration which displays the same right-eye (or left-eye) image into the respective eyes of each viewer. In the basic embodiment, eye-tracking is employed for each viewer and each viewer will observe a stereoscopic three dimensional scene with no viewing aids.

In what follows, references will be made to certain components, or to certain sub-systems used in this invention, which are either available standard functional units, or which are sub-components which can be assembled according to the requirements spelled out in this disclosure by one skilled in the appropriate art. These items will therefore not be accorded the same detailed explanations as the completely novel elements of this invention, which include the assemblage and special configuration making use of these sub-units. This includes such items as an LCD panel, or digital video graphics circuitry such as one that separates a left-eye video stream from a right-eye video stream, or an eye tracking imager with eye tracking processing circuitry.

Glossary of Terms Used in the Disclosure:
LCD Panel, SLM Image Panel:
These and similar terms will be used herein in a general sense to mean a flat panel image screen, or a spatial light modulator, not necessarily liquid crystal, with the following features:
1. It has no backlight panel.
2. It must be transparent, that is to say light which passes through the screen is modulated by the color/intensity vales of the screen pixels but does not, appreciably, change direction or get diffused when leaving the screen.
VPL, Vertical Picture Line:
This defines a narrow, vertical, picture element, of full screen height, which may be one or several horizontal resolution elements wide. For convenience of explanation, later, a VPL will generally be considered to be a single pixel wide. Thus, for example, the high definition format referred to as 720p which has 1280H×720V lines of resolution, will have 1280 "vertical picture lines", VPL's, each of which is one pixel wide and has 720 pixels arranged vertically in a column. In general, however, for very high resolution screens, it is feasible to configure VPL's which are several pixels wide while still keeping left/right scenes separated for the appropriate viewing eyes, Transmissive VPL, Opaque VPL:
Refers to the light transmissive states of a VPL; when it is "transmissive" it allows the color values of the pixels in the VPL column to modulate the light passing through VPL. For the remainder of the SLM, all VPL's are opaque, or alternatively blocked by a shutter, if not specifically noted as being transmissive.

Selected VPL's:
Refers to VPL's which are made transmissive. When not selected, or un-selected or de-selected, VPL's are opaque.

Light Array, Array Lights, Light Array Panel, Strobe Lights Etc.:
Refers to an array of selectable, individual sources of light of generally small horizontal dimension closely spaced and extended vertically. They might be point sources of light but a preferred embodiment would have thin vertical profiles of light. The term "strobe lights" will also be used herein because these lights must supply bright flashes of short duration. The lights might be xenon or similar discharge lamps or a solid state array of vertical lines of flashable lights or of discreet LED lamps arranged in an array of columns where each column consists of one or several LED lamps or thin vertical rods of glass or acrylic or similar material with lights at one or both ends and treated so as to emit light along its length.

Frame Time:
The time required to display 2 complete pictures (right-eye and left-eye) which produces a full stereoscopic image.

Scan Time, Also Field Time:
The time to complete one picture, or one field, (either right-eye or left-eye). This is one half the frame time.

720p Picture Format:
For purposes of explanation herein, the TV picture format will be assumed to be what is commonly referred to as 720p. This format has 1280 lines of horizontal resolution and 720 lines of vertical resolution. A frame time of 1/30 sec will be assumed and two fields, the right-eye image and the left-eye image, will each take 1/60 sec. These numbers may be departed from and other formats may be used without in any way departing from the spirit or scope of this invention.

Placement of Display Components:
When object A is to the rear of object B, or A is behind B then it is understood that object A is further from the viewer than B. Object A is in front of object B if A is nearer to the viewer.

Vertical and Horizontal:
These refer to conventional screen coordinates and not necessarily to Earth coordinates.

DETAILED DISCLOSURE OF THE INVENTION

Figure 1:
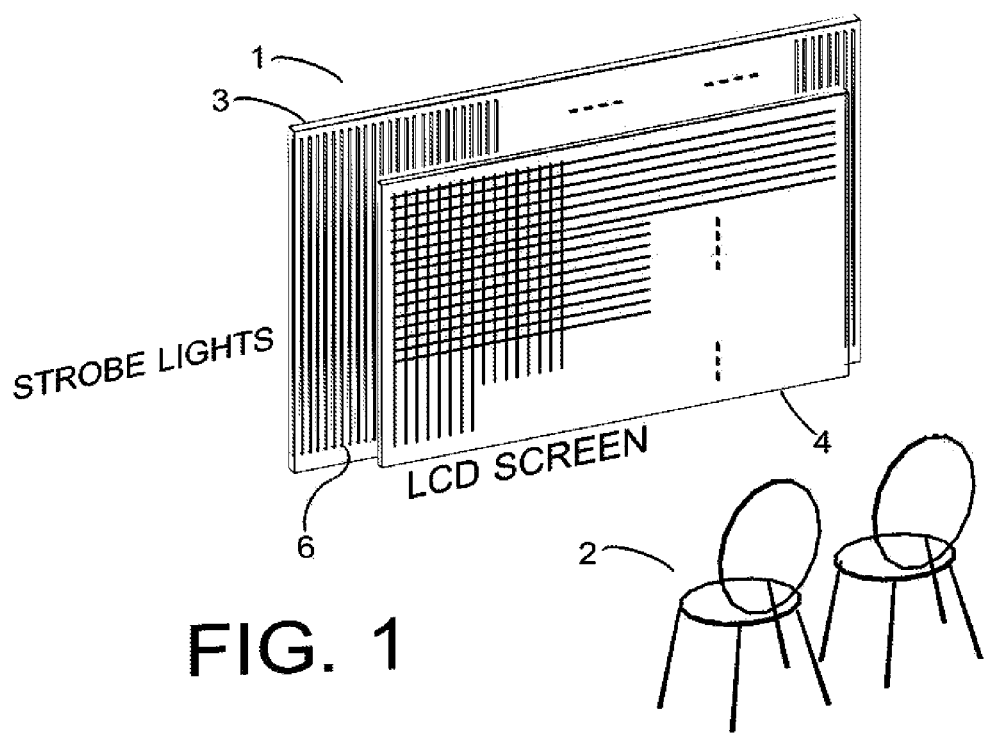
FIG. 1 is a depiction of the main components of the Autostereoscopic Display System.

The basic viewing screen, 1, described in this patent, and shown in its basic form in FIG. 1, can produce a stereoscopic image in one or several viewer's eyes located anywhere in the viewing area, 2, in front of the screen. This is accomplished without requiring any viewing aids worn by the viewers.

The viewing screen 1, in FIG. 1, consists of two panels; the light array panel, 3, and the LCD image panel, 4. To permit clarity for illustration in FIG. 1, the separation of the elements, 3 and 4, are shown not in proper scale. Panel 3 is placed several inches behind panel 4.

The LCD panel which will be referenced in this invention differs in three ways from most flat panel screens in use: it must be transparent meaning its pixels are transmissive and do not diffuse light coming through the panel and it does not have a conventional backlight panel.

The LCD panel, 4, must also be configured to allow convenient and simple selection, for display, of one or several vertical columns, each one, for example, the width of a single horizontal resolution element, in one embodiment, and defined above as a VPL. This may be accomplished by electrically configuring the LCD panel to allow switching single-pixel-wide columns between opaque or transmissive states at relatively high speed. Although this disclosure will be based on a VPL as a single pixel wide entity, in the case of super-high resolution screens a VPL could also be more than one pixel wide as a variation of the principles within the scope of this invention because, then, more than one VPL could reliably be directed into a single eye, at one time, according to the method to be elaborated later.

Alternatively, the LCD panel might consist of two light modulating layers one of which is the transparent image panel, the SLM image panel, which displays images which are static for a field-image time, for example ⅟60 second. The other layer, a shutter layer, an SLM-shutter panel, consists of pixels of equivalent resolution but which switch only between transmissive and opaque states. Then VPL selection is accomplished by switching, in the shutter layer, selected columns, or shutters, to cleared pixel states which then select the VPL pixels of the SLM image panel for display while all other shutter pixels remain dark.

The strobe lights panel, 3, has a number of narrow vertical light sources, said number is not necessarily equal to the horizontal picture resolution, but could be considerably fewer, and will be presently described in greater detail. We will use later, in one embodiment by way of example only, 570 vertically oriented light sources. Other possibilities include light sources within enclosures which have one or several vertical exit slits producing the equivalent of one or several light sources per enclosed lamp. For purposes of explaining the principles of this invention, we will consider arrays of single light sources without additional masking or slits modifying the lights. However, applying additional optical elements at the light arrays does not depart from the spirit or scope of this invention.

Consider a single eye in the viewing area, and one of the strobe lights, 6, which is set to be fired, or strobed. Within the constraints of the display parameters assumed later, there will always be at least one, generally two, VPL's on the LCD panel which, are close enough to be within the same vertical plane with the light emanating from the selected strobe light and an eye in the viewing area. That eye will correctly view the one or the two VPL's simultaneously. These VPL's, referred to as "inline" VPL's, are then selected, or made transmissive and when they are stable the strobe light is fired.

Assume a certain eye in the viewing region is currently in line with a certain selected VPL and a certain strobe lamp. Because the light from the strobe lamp spreads vertically, it will illuminate the entire length of the VPL and will pass through it with rays from the lamp maintaining the horizontal projection of the direction they had from the light source to the VPL. The eye will see the full length of the VPL completely lit with all its pixel's proper color values. Any pixels contained within this VPL, seen by this eye, will not be seen by any other eye at this moment. It is assumed here, of course, that only one eye in the viewing region is in the same vertical plane just described. If this process is repeated, for one eye, with every VPL made transmissive one by one, lit by a strobe lamp which is lined up with the transmissive VPL and said eye, and if the process is completed within a a persistence-of-vision time then the eye will see a complete image on the screen.

The height of the strobe light panel, 3, is set by geometry. It will be slightly higher than the height of the SLM. so that the entire height of each VPL is visible to the lowest or highest viewers in the viewer region Shown in FIG. 2, a system block diagram, a video signal, 9, provides video input for the autostereoscopic display system. This signal may originate as a TV signal, a playback signal from a video recorder, or may be any signal providing right-eye and left-eye video image information. The signal must then be re-formatted in the stereo-separator unit, 10, which separates the right-eye/left-eye images into two separated video streams one of which is the right eye image and the other the left eye image.

Synchronization signals separating left/right image video as well as all other signals used for synchronization are sent on line 21 to the Sequential Strobe Control unit, 14. The Sequential Strobe Control unit, 14, then sends the required synchronization signals, on line 29, to the "VPL's vs Strobe" unit, 15, the function of which will be explained later.

By way of example only, in the descriptions to follow, we will assume the video resolution to be 1280 horizontal pixels and 720 vertical pixels. The stereo separator unit, 10, is a basic building block used in digital graphics processing well known to designers in the art and will not be further detailed here. The format, 1280×720 lines is used here as an example for explaining the operation of the system but does not limit the applicability of this system to this format only. In addition, a frame rate of 30 per second will be used here but the system as disclosed in this patent is not limited to any specific frame rate.

Located in the vicinity of the viewing screen, 1, is an eye tracking imager, 11, and an eye tracking processor, 12. These two units measure the continuously varying positions of all eyes in the viewing region in a convenient, two dimensional, coordinate system, X and Y, to be elaborated later. The measured positions are maintained and updated in the Eye(s) Position Data Table, 13. One or several small markers placed around the rear of the viewing area (not shown) could be used as alignment points to allow the imager to maintain the required precision of measurement. Eye tracking techniques will not be further discussed as such techniques would be familiar to those skilled in the art.

The sequential strobe control unit, 14, using a list of strobe lights and the sequence and grouping in which they are strobed, sends the strobe selection signal to the viewing screen as well as to the "VPL's vs STROBE" unit, 15. The VPL's vs STROBE unit, 15, accepts the measured eye coordinates, Xe and Ye, 16, of all eyes in the viewing area, and finds VPL numbers for VPL's in line with viewing eyes and the strobe lights which are about to be strobed. The VPL numbers, in this context, are simply numbers which identify the individual VPL's and might be, for example, numbers 0 to 1279 for the VPL's in numerical order sequence. The fetched VPL numbers are sent to the LCD panel, on line 20, to select, or make transmissive the inline VPL's. The "VPL's vs Strobe" unit also sends the R/L IMAGE SELECT PULSE, 17, which alternates the selection of the right-eye or left-eye image, in the R/L video selector, 18, to be sent, on line 19, to the LCD panel, 4, of FIG. 1.

The "VPL's vs STROBE" unit, 15, based on the current positions of the eyes, creates a data table of VPL numbers, VPL,n, versus strobe lamp number, STR,n for each eye in the view region. For the configuration used presently by way of example, to explain the operation of this invention, this table will have, for each eye, (left or right depending on the current scan) 570 (for example, to be explained later) sets of numbers; a strobe lamp number and all the corresponding "lined-up" VPL numbers. Every strobe lamp will be fired (in groups) and generally two VPL's from the data table will be made transmissive per strobe lamp per viewing eye. Thus, after the succession of groups are fired, every one of the 1280 VPL's will have been seen at every eye position in the viewing area, and as will be described below for one particular embodiment, generally two VPL's will be selected for every strobe/eye lineup. Although flashing the strobe lamps in groups represents the preferred embodiment for this disclosure, the lamps, in some configurations, may also be fired singly without departing from the spirit or scope of this invention.

The VPL's remain transmissive until the just-fired strobe lamps turn off and then the transmissive VPL's are made opaque and the next group of VPL's are selected and the process repeats. The right or left eye picture is stored in the LCD panel for one scan interval (⅙₀ sec) and then the picture for the other eye is similarly stored during the next scan interval to avoid the need for extremely fast and frequent picture switching. The only need for high speed switching, as described earlier, is in making VPL's transmissive or opaque and this could be accomplished with a separate SLM-shutter panel in which the shutters are as wide as the VPL's and are aligned with the SLM image panel's VPL's. The SLM-shutter panel columns, using LCD or comparable technology, requiring simply binary states, opaque or clear, would be capable of the high speed switching required.

A workable configuration for this invention is not, of course, limited to what was described with reference to FIG. 2. It is understood that the same functionality described with FIG. 2 might be achieved in many different, but equivalent, configurations without departing from the intent and spirit of the invention.

The basic principles of autostereoscopic display as embodied in this invention will now be explained in greater detail in FIG. 3a starting first with reference again to FIG. 1. What is required is to direct selected images into selected eyes. The location of the viewers eyes must be known for the viewer adaptive approach discussed here and the locations are determined using available eye-tracking technology shown in FIG. 2.

As described earlier, one of the strobe lamps will always be closely in line (in a vertical plane) with at least one of the VPL's, and an eyeball, so as to allow the light from those VPL's to enter each of the lined-up viewing eyes.

Figure 3A:
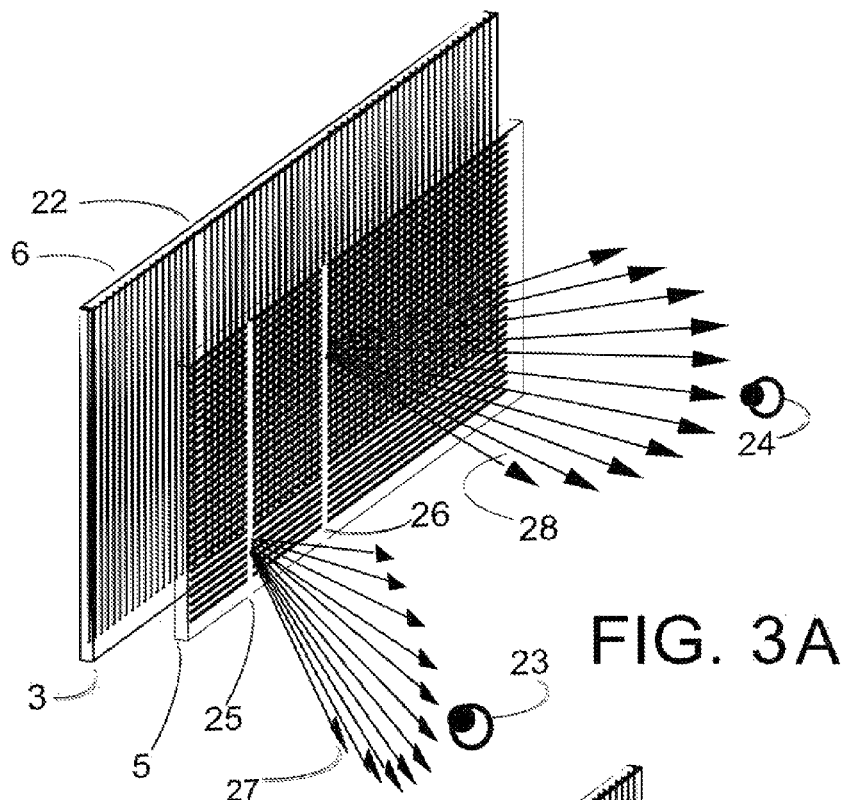
FIG. 3 illustrates the concept of optical alignment between elements of the invention and viewers eyes.
Figure 3B:
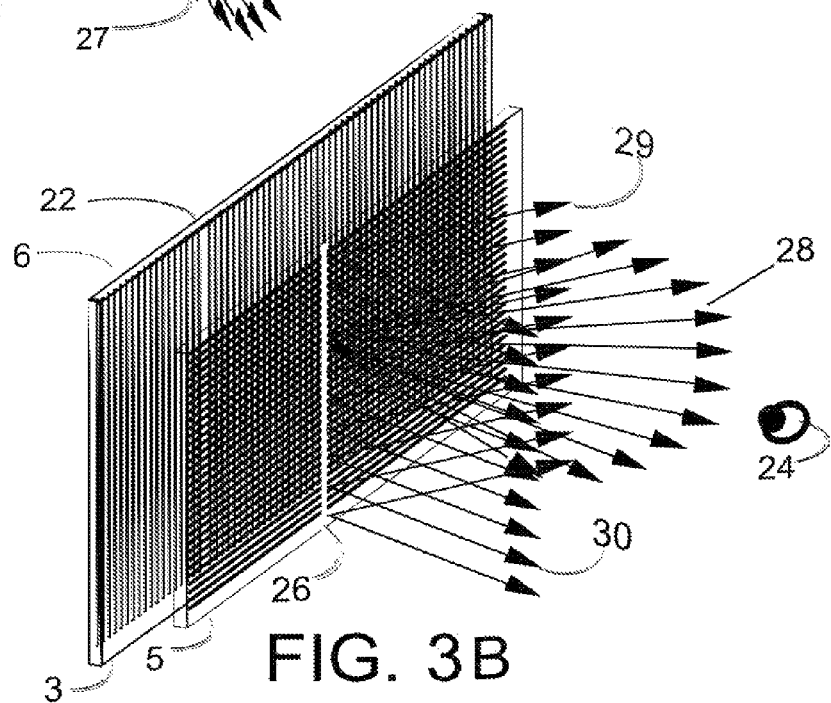

In FIGS. 3a and 3b both the SLM shutter panel described earlier, and the image SLM panel, which are normally in close proximity with each other, are shown as one panel at 5. The strobe lights panel is shown at 3 with one strobe, 22, shown lit. In FIG. 3a two VPL shutters are represented as transmissive at 25 and 26 while all others are opaque.

Thus while the LCD image panel maintains an unchanging image for a field period, for example ⅙₀ sec, the second SLM layer would be rapidly producing clear VPL's, such as 25 and 26 to allow light to pass through single VPL's in the image panel. The high speeds required for VPL selection would be more easily attainable in the second SLM layer, where switching only between transparent and opaque states is required and where ferroelectric liquid crystal technology would be applicable.

The strobe lights, 6, are shown all dark, unlit, except for one, 22 which is lit. As will be shown presently, more than one strobe light is lit simultaneously based on the parameters chosen for the particular design. Additionally, each strobe light may have more than one exit slit for the light it emits although for all the examples to follow this will not be the case. For the design example described later, 5 strobe lights are lit simultaneously.

By way of example only, two eyes are shown at 23 and 24. Thus, as described earlier, every VPL will, at some point during the scan time, be lit (transmissive) when said VPL is in line, in a vertical plane, with an eye and one of the strobe lights. In general, every VPL, of the 1280 VPL's, will be selected and lit as many times as there are eyes (both left and right) in the viewing area.

Figure 2:
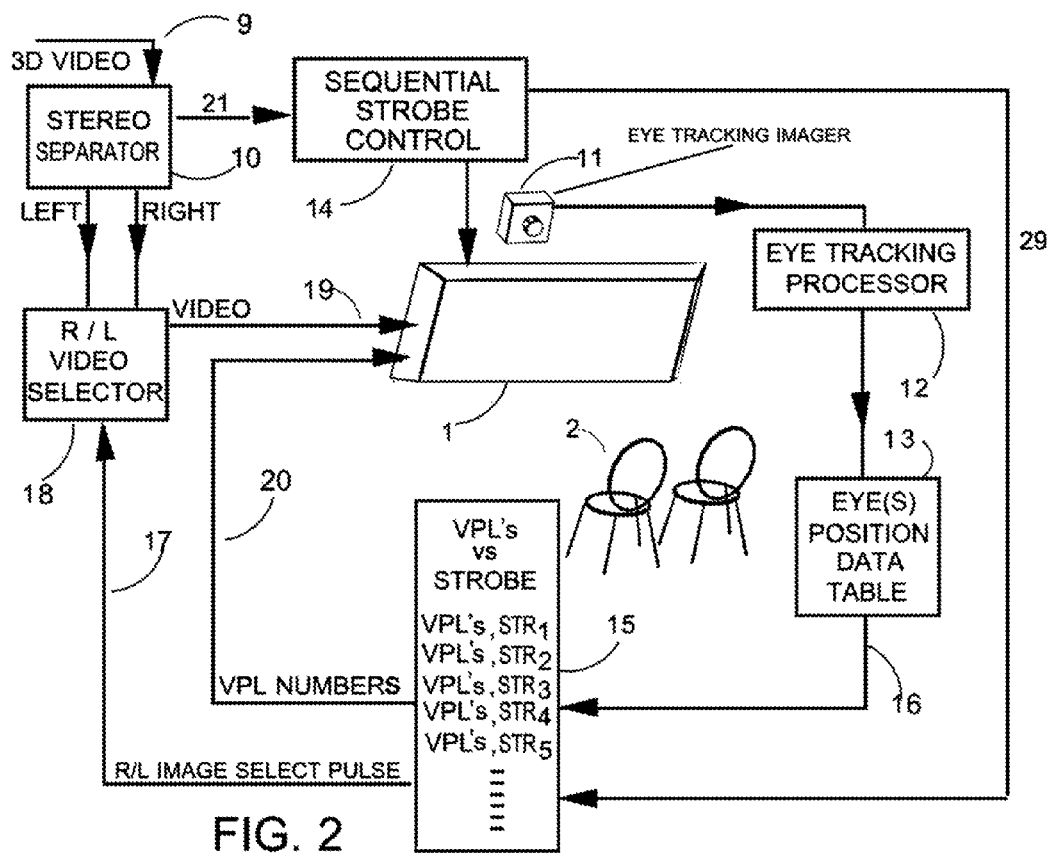
FIG. 2 is a representation of a functional block diagram of the Autostereoscopic Display System.

In this example shown in FIG. 3a, the transmissive VPL's. 25 and 26 were selected by the "VPL's vs STROBE" unit, 15, of FIG. 2, because they were lined up with the lit strobe, 22, and eyes 23 and 24 respectively as would be seen in an overhead view of the apparatus. At 27 and 28 we see a bundle of light rays, each contained within vertical planes, which emanate from single pixels each from VPL's 25 and 26 respectively. In a view from above, the bundle of rays, 27, would be a single, straight line connecting the eye 23 and the VPL, 25, and which if extended meets strobe light 22. The same applies to eye 24 and VPL 26.

Although FIG. 3a shows just one ray bundle emanating from each of the two VPL's it is understood that similar ray bundles emanate from every pixel contained in each transmissive VPL so that each eye, 23 and 24, in this case and at this point in time, will see every pixel, from top to bottom, in VPL's 25 and 26 respectively. Furthermore, because of the close spacing of the VPL's, several are sufficiently closely lined up with an eye and any lit strobe so that several adjacent VPL's (generally two) may be selected simultaneously for every eye in the viewing area. As will be shown later, although more than one strobe light may be aligned with an eyeball, one of them will be more closely aligned than the others, and the best aligned strobe in each case is picked for any given eye and VPL.

FIG. 3b illustrates how an eye, 24, sees the entire length of a VPL The set of light rays 29 and 30, which are coplanar, depict the approximate upper and lower limits of rays emanating from all pixels in the VPL represented by the vertical lit line at 26. As in FIG. 3a, the ray bundle, 28, represents the rays from just a single pixel in the VPL but typifies the rays which come from every pixel along the VPL. Thus FIG. 3b illustrates how light rays transmit from every pixel on VPL 26 to the in-line eye at 24.

We now consider that the viewing area has not just one viewer, but multiple viewers, and in general, pairs of eyes for all viewers in the viewing region. Thus VPL's are made transmissive, not just one at a time, but several in groups to provide lit VPL's for every left (for example) eye in the viewing region. Thus, while a given strobe light(s) is/are lit, all VPL's on the LCD panel are selected for all left viewing eyes in line with the lit strobe light(s). This process proceeds for all strobe lights and every left eye has viewed the entire left-eye scene. Then the same process repeats for all right eyes. Thus in one frame time (for example 1/30 sec) the process described herein would have illuminated every part of the screen with all the vertical picture lines of the scene and a complete autostereoscopic scene will be seen alternating with all left eyes and all right eyes.

The radiant energy required for the strobe lights will now be analyzed. We will use as a baseline example, a requirement for 500 candela per square meter screen brightness. Thus the baseline goal is 500 lumens per square meter per steradian. Since in this invention the strobe lights are directly seen through a transparent image panel, the luminance of the lights should meet the 500 cd (candela) per sq-m requirement. In a possible embodiment to be described later, 570 light sources, each 0.115 inches wide and approximately 38 inches high form the light array behind the SLM. The height of 38 inches is based on the SLM height of 29 inches and the distance of 5 inches between the light array and the SLM panel. Thus 38 inches is needed to assure sufficient vertical coverage six feet in front of the screen.

The luminosity of each light must, individually, meet the screen luminosity requirement, 500 cd/sq-m. Since the lamps are strobed we must consider the average lumen output (lm (avg)) and then compute the peak requirements. Assume, for example, the lamps are designed for a light pattern of 90 degrees width and 90 degrees height. This is 8100 deg-sq and is approximately equal to 2.47 steradians. Since the area of a light of dimensions 0.115 in by 38 in is 0.0028 m-sq the luminosity of the light will be determined by $$500 \text{ cd}/((m-sq)*(steradians)) = lm(avg)/(0.0028*2.47)$$

lm(avg)=3.46 μm.per light.

Duty cycle, (to be explained later); DC=102.3 usec*30/sec=0.0031 (for either right or left eye).

Then, 3.46/0.0031=1116 μm-peak, a value easily achievable using arc lights such as xenon, or 2 LED's, one at each end of a light emitting lucite rod. As of this writing two LEDS can supply the required lumens per light at a power level of about 140 lumens per watt. Thus using LED's will require about 8 watts peak per lucite rod.

The average power will then be: 570 rods*8 watts*0.003 DC=13.7 watts(av). This is power to present a picture to one eye, thus for two eyes plus estimating a 50 percent effectiveness for the optics, total screen power required is 2*2*13.7=54.8 watts, or about 54.8/(570*2 LED's)=0.048 watts(avg) per LED emitter.

An important consideration is the switching speed required for the LCD screen. As described earlier, the scene, in our example format, changes each 1/60 of a second between right eye and left eye views. However, VPL's must be made transmissive and then opaque in the time allocated for each group of strobe lights which are strobed together, approximately 100 microseconds in this example. In a preferred embodiment, the entire scene, in the SLM image panel, remains fixed for the entire 1/60 of a second. The selection of VPL's is accomplished using an auxiliary SLM layer which functions only to provide a shutter image which then selects the VPL's in the SLM image panel layer. The shutter image panel need be only either clear or opaque but must operate at the higher switching speed. The required switching speeds for the VPL shutter columns are, however, achievable at the limits of ferroelectric liquid crystal technology.

Figure 4:
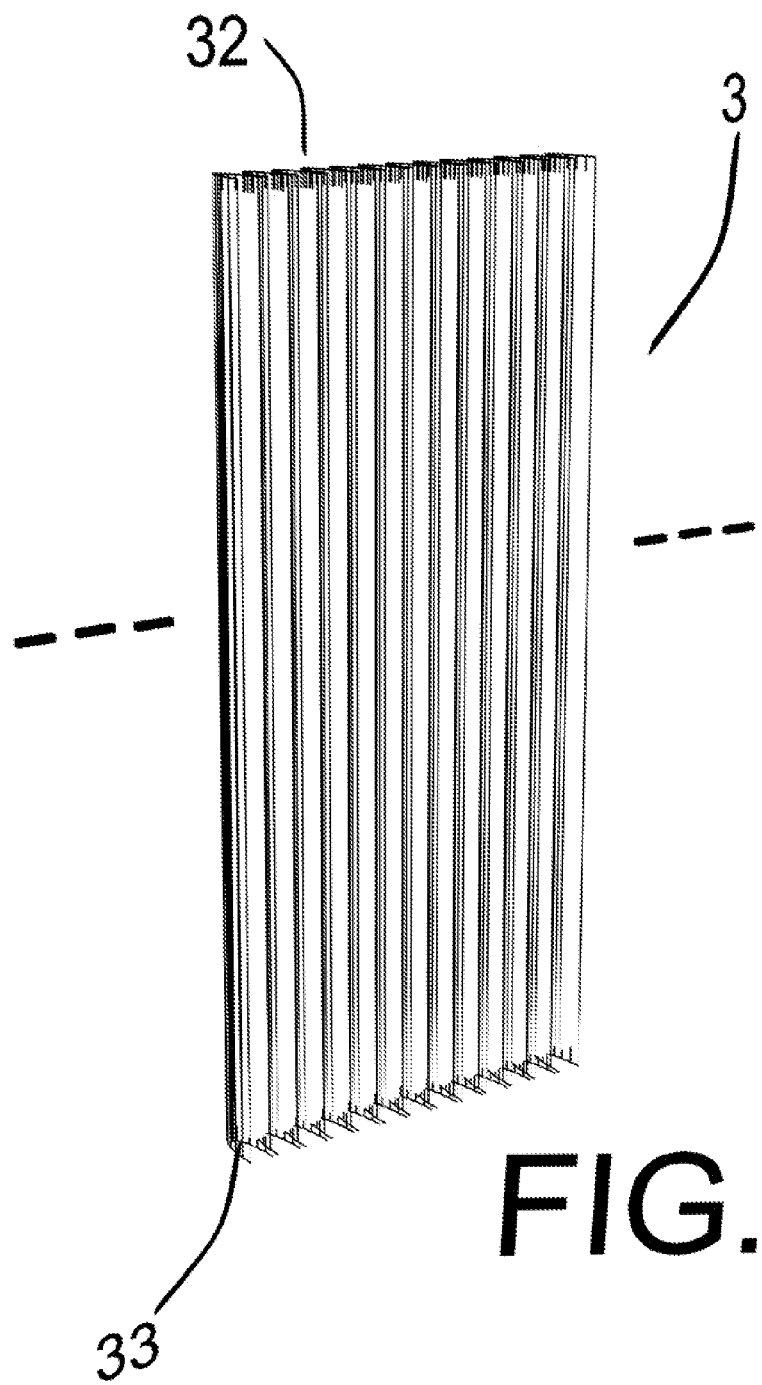
FIG. 4 is a view of the array of lights which illuminate the viewing screen.

FIG. 4 shows a magnified detail of the strobe lights panel, 3, showing strobe lights, 32, embedded in adjacent closely spaced recessed areas, 33, one for each lamp.

The interior of said recessed areas containing the lights will be highly reflective to promote most of the light to leave the enclosure.

In one embodiment, lamps shorter than the height of the image SLM, or vertically separated lamps, may be used in conjunction with a vertical diffusion element in front of the SLM to provide light from each pixel to all eyes at different heights. The preferred embodiment however, is to use strobe lamps which are vertically longer than the height of the SLM eliminating the need for the vertical diffusion. The lamps lengths will be based on geometry such that the lowest and highest eyes in the viewing region receive direct light through each pixel from the array panel lamps.

All exposed surfaces in the interior of the display screen behind the LCD panel must be coated to be as dark as possible to minimize unwanted light being visible to the viewers through the SLM image panel.

The strobe lamps, 32, will, in this preferred embodiment, be flashed in small groups, (each group with possibly five at a time flashed simultaneously) with groups being lit in succession, though other embodiments of this invention might utilize the lights to be lit in other orders and other grouping or singly without departing from the scope of this invention.

The lamps may be xenon flash types, or any similar type of discharge lamp which is capable of brief, high brightness output The color of the lights is preferably neutral so as to not offset the required image colors. In the event the lights are not sufficiently neutral compensation on the image screen could be used to compensate the error.

Figure 5:
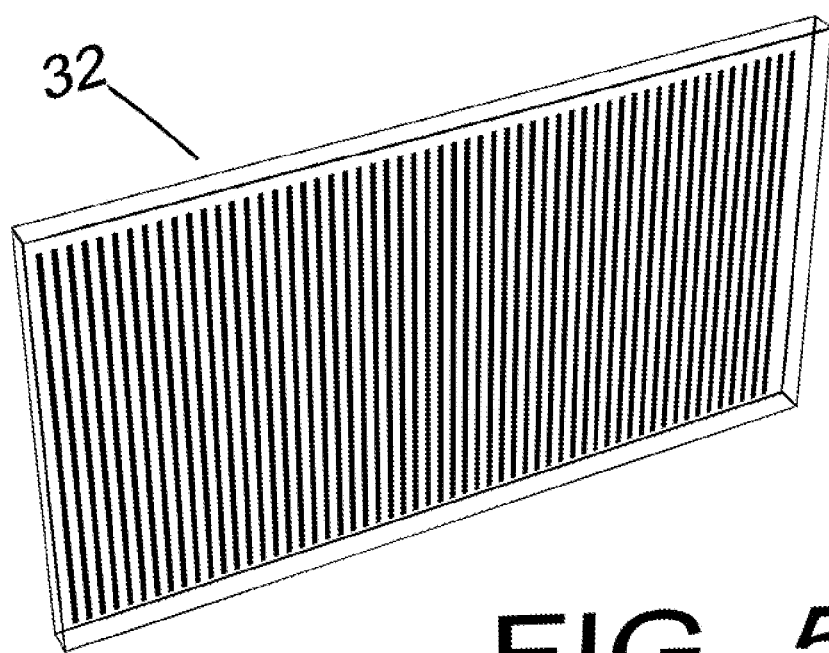
FIG. 5 shows another option of the array of lights.

FIG. 5 shows, 32, a suitable embodiment, as an example, consisting of thin vertical light sources which might be strips of light emitting semiconductor material. Alternatively, the light sources might be rods of glass or acrylic or similar material with lights at one or both ends and treated so as to emit light along its length. High intensity LED's would function as suitable light sources in this case.

Non-stereoscopic video content: Conventional monoscopic video content may be viewed by setting all VPL's transmissive and flashing all strobe lights simultaneously or in some arbitrary sequence at a frame rate of, for example, 60 per second.

A source of non uniform illumination occurs for shallow viewing angles as would occur for viewers located at the sides of the viewing area. To improve this, the algorithms to be used for selecting VPL's and strobes can also compute the viewing angle for any VPL/strobe combination and VPL brightness can be dynamically adjusted accordingly to maintain generally uniform intensity across the screen.

FIG. 6a, is an overhead view showing how viewing zones, W1 and W2, per eye, are formed in a particular embodiment of the invention. In this example it is assumed that each strobe light has a single wide opening, 39, to allow its light to exit. The spacing of the strobe lights, (and their centers) are represented by the short vertical lines at 3 in FIG. 6*a*. The width of the light sources may be greater than the required spacing of the lights and this will be discussed later.

Figure 6:
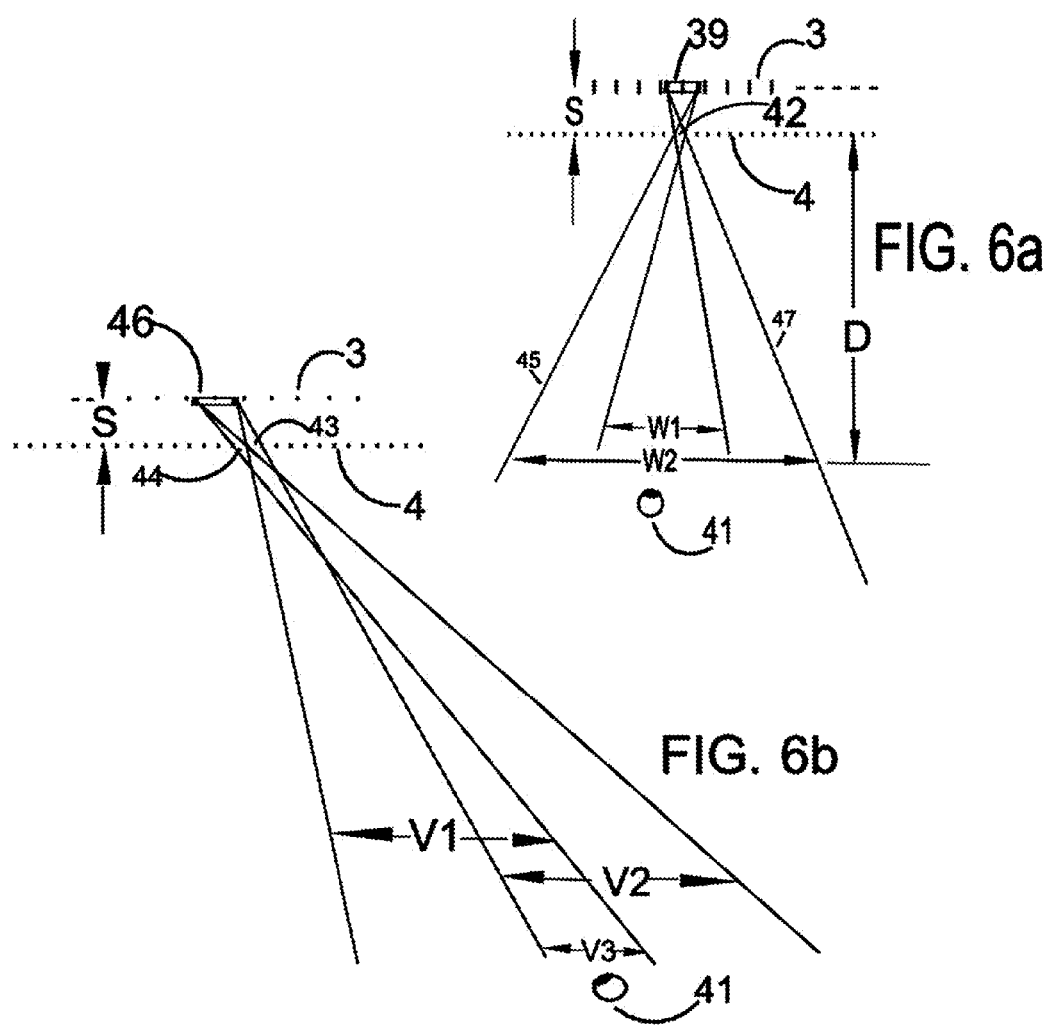
FIG. 6a shows an example of the path of light rays which go from a selected light of the array of lights through a pixel column of a transparent viewing screen to the eye of a viewer.
FIG. 6b shows an example of the path of light rays which go from a single light source through two pixel columns of the transparent viewing screen to the eye of a viewer.

FIG. 6*a* will serve as a basis for deriving expressions for computing the viewing zone dimensions at the viewer's eyes. Given the following:

L=the width of a strobe light shown in FIG. 6, 39.

d=the width of a VPL one of which is shown at 42. (The space between the dots.)

A VPL here is assumed to have the width of a single horizontal picture element, pixel.

D=the distance from the image panel, 4, to the viewing region.

S=the distance the strobe array panel, 3, is behind the image panel, 4.

Considering the point of intersection of the two light-rays, 45, 47, shown defining the limits of zone, W2, three triangles may be defined:

1. the said point of intersection and the VPL width, 42,
2. the said point of intersection and the strobe light width, 39, and
3. the said point of intersection and the view zone W2.

In addition, consider the zone formed by two rays from one end of the light 39 which pass through the two edges of VPL 42.

The following expressions result:

$$W2=(D-S)*(L+d)/S \quad (1)$$

$$W1=W2-(2*D*d)/S \quad (2)$$

The zone W1 is seen to be a region within which an eye, 41, will see the VPL, 42, evenly illuminated by the light 39. An eye located outside of W1 but within W2 will see reduced illumination of the VPL diminishing to zero at the edge of zone W2. The goal is for all view points to be located only within W1 type regions and this is achievable as will be shown.

In order that there be no spaces between W1 zones in the viewing region, and also to use the minimum number of strobe lights, the spacing, DEL, between the lights must be:

$$DEL=\text{required horizontal separation of the strobe lights}=S*W1/(D-S) \quad (3)$$

Equations (1) to (3) are approximate, but very close, expressions for realistic display configurations.

Consider the following case as an example of a configuration:

1. D, the LCD panel to viewer distance equal to five feet,
2. S, the distance between the light panel and the SLM panel is 5 inches,
3. d, the VPL spacing on the LCD panel equal to 0.04 inches,
4. L, the strobe light exit width to be determined,
5. W2, the distance between the edges of the view zone set to 3 inches.

The viewing region, W1, with an eye positioned as shown at 41, is seen to be a region in which the light rays from light, 39, passing through the VPL, 42, maintain relatively constant brightness across the W1 zone. The region W2 is seen to be a region where the illumination goes from the value within W1 to zero.

$$W2=3=(60-5)*(L+0.04)/5 \quad \text{From (1)};$$

thus L=0.23 inches.

$$W1=W2-2*D*d/S=3-2*60*0.04/5=2.04 \text{ inches}.$$

then; 2.04=(W2−W1)/2=2.5, acceptable distance from anywhere within W1 to the edge of W2.

The required strobe light spacing, DEL, is:

$$DEL=S*W1/(D-S)=5*2.04/(60-5)=0.185.$$

The W1 zones represent regions within which a viewing eye sees the VPL's with the same intensity anywhere within the zone. The W1 zone is typically one to 2 inches wide at the viewer. The W2 zones are designed to limit viewing to one eye only as the intensity goes from to zero within that zone. This zone is shaped so that when an eye is anywhere in the W1 region the person's other eye is outside of the W2 region. Considering the average inter-ocular distance to be 2.5 inches, the W2 width may exceed that since one eye is always within W1 and thus the distance from the eye to either end determines the 2.5 inch limit.

Thus:

$$W1+(W2-W1)/2<2.5 \text{ inches}.$$

e.g. if W1=1.5 inches then W2 may be 3.5 inches max.

Since 0.185 inches required for spacing is less than the width of each light the width of the lights will be halved and the number doubled. Lights will then be lit in adjacent pairs to provide the proper W1 and W2 zones as computed earlier. The spacing then will guarantee that every position in the viewing region is within a W1 zone for every VPL on the screen. Thus the spacing is 0.115 inches which is the distance between centers of each pair of lights.

In order that all VPL's be visible in the entire viewing area the light panel for this configuration must be 65.5 inches wide and the SLM is 51.2 inches wide. Since the lights are 0.115 inches wide, 570 lights are needed.

As will be seen presently, under the current assumptions, a W1 region can always be found for any VPL so that an eye, 41, will always be somewhere within W1. Thus, because the average inter-ocular spacing is slightly more than 2.5 inches and so the widths chosen here for W1 and W2 will never put left-eye pictures into the right eye or vice-versa. The illumination function at W2 closely approximates a trapezoidal function.

FIG. 6*b* shows how two VPL's may be made visible, with this configuration, simultaneously to a single eye. Strobe light source 46 is lit and VPL's 43 and 44 are transmissive and produce constant illumination viewing zones V2 and V1 respectively. A zone common to V1 and V2 is shown at V3 where viewing eye, 41, can see both VPL's simultaneously lit by a single strobe light, 46. This demonstrates how fewer strobe lights than VPL's can nevertheless make every VPL visible to every eye in the view region.

To ensure that VPL's are not missed, lineups are produced by taking every VPL once and finding a single, best aligned, strobe light, 39, for each eye in the viewing region. This guarantees that every VPL will be seen by every eye, and that any VPL is chosen exactly once for each eye/strobe lineup. As will be elaborated later, this procedure will produce a data set of strobe/VPL lineups for every left eye and another data set of strobe/VPL lineups for every right eye. Various other approaches and orders for selecting strobe/VPL lineups which might be more suitable within other embodiments might be used while still remaining within the spirit and scope of the present invention. It should be recalled that for this set of parameters it was necessary to flash strobe lamps in adjacent pairs in order to satisfy the required spacing between light sources. Here, as elsewhere in this disclosure a reference to a strobe light might mean more than one light is lit simultaneously and treated as a single light source with the light emanating from the center of the group.

As with any type of autostereoscopic display system, errors in the placement of the light sources which project through the image panel and send directed light rays to viewer's eyes will cause unwanted displacement of image pixels relative to the eyes. When the light source is integral with the image panel the required positional precision of the components of the panel is very high. In this invention, because the strobe light array is located a short distance behind the image panel the error in position of the light sources may be considerably relaxed. For example, with a 5 inch separation between the light source array and the image panel, and a viewing distance of 5 feet, the light sources must maintain a positional accuracy of 0.0083 inches, after an installation, to keep the viewing zones to within 0.1 inches of the expected positions.

As mentioned earlier, the use of two or more slits per lamp are included in the spirit and scope of this invention. Such arrangements may allow shaping the illumination function as might be better suited for certain applications.

Figure 7:
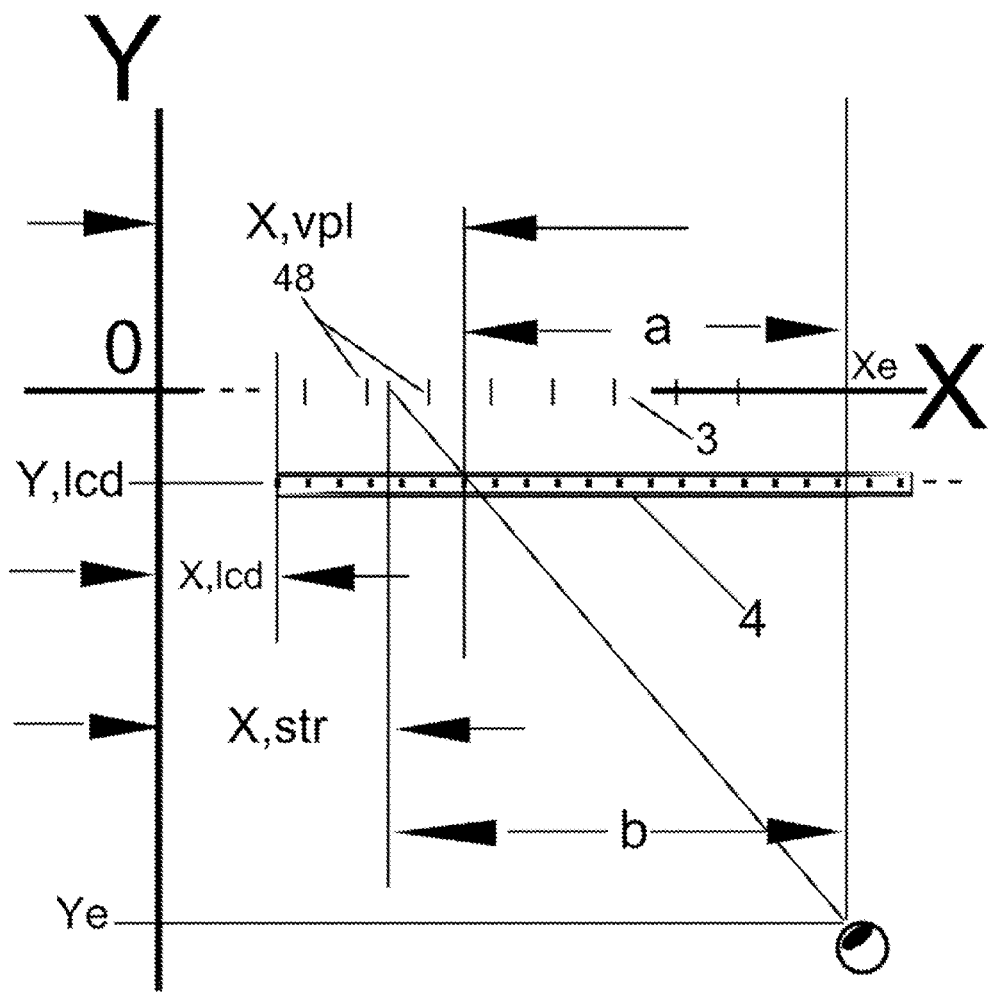
FIG. 7 illustrates the geometry of the system which is used to explain the computation of optical lineups between the array lights, vertical pixel columns and eyeballs.

FIG. 7 shows an overhead view of the screen and an example of a coordinate system which may be used to describe the operation of this system, and in particular the "VPL's vs Strobe" unit, 14, shown in FIG. 2, which computes which VPL's are lined up with viewing eyes and strobe lights. The strobe lights may be fired in any order although a sequence of groups to be described later is one of several possible efficient methods. As strobe lights are scheduled for firing, the VPL's which are to be made transmissive are selected from the "VPL's vs Strobe" table which holds the data matching strobe lights with lined-up eyes and VPL's. The dimensions and placement of the various components of this invention may be varied as system parameters are varied without departing from the basic scope disclosed in this description.

It should be recalled here that although the description of the strobe-light array is generally based on individual lights, an individual light source may actually be several adjacent lamps lit in unison. Thus individual lights used in the analysis may mean the light from several lamps. Specifically, in the following, lamps will be identified by numbers, in this case 0 to 569, where each number refers to a pair of adjacent lamps, lit together, where the numbered position is the position of the midpoint of the lamps. Note, as well, that the right-side lamp of any pair is also the left-side lamp of the next numbered pair. The scope and spirit of this invention is not, however, limited to any particular grouping of lights in the strobe light array.

FIG. 7 shows VPL locations at 4, as a horizontal projection, with VPL center-lines as tic-marks within the rectangle, 4. The strobe light panel is shown at 3, along the X axis, with the positions of the centers of individual lights shown as vertical tic marks, as at 48 for example.

The following illustrates an approach for finding line-ups between eyes, strobe lights and VPL's.

For this example we assume, for simplicity:
1. The screen resolution is 1280H×720V, thus there are 1280 VPL's.
2. The horizontal spacing of the strobe light sources is 0.115 inches, but the illumination source width is 0.23 inches for the pair.
3. The image screen is 51.2 inches wide (1280 times 0.04 inches).
4. The viewing region width is ten feet wide at a nominal distance of 5 feet.
5. The light rays from any VPL, in the viewing region at 5 feet, will produce a viewable, uniform brightness region contained approximately within a 2 inch wide bundle It should be noted that the viewers are not confined to a single row, The seating might be staggered in two or more rows as long as viewing eyes are in view of the eye tracker and the screen.
6. The srobe light array, 3, is approximately 5 inches behind the image panel, 4.
7. Xe and Ye in FIG. 7 are the X and Y eye coordinates in the horizontal plane and the position of an array light source will be considered to be the X value of its vertical axis.

Figure 9:
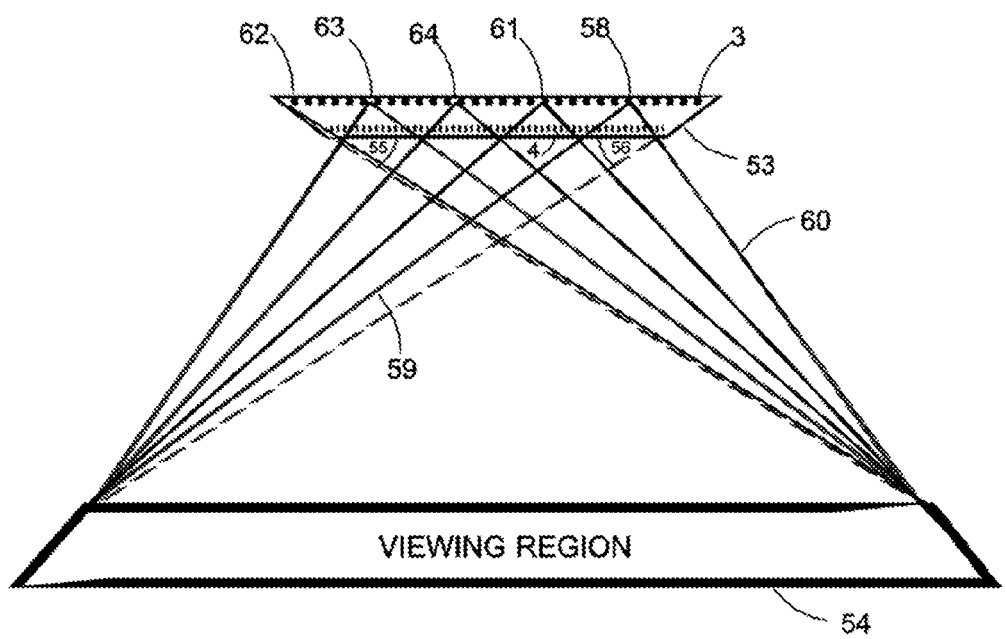
FIG. 9 shows the relationship of a viewing region to the autostereoscopic screen and how complete coverage is achieved for every pixel on the viewing screen.

These parameters lead to a width of 65.466 inches for the width of the strobe panel (see FIG. 9, 3, for the configuration). With strobe light widths of 0.115 inches there are, therefore, 570 strobe lights.

For each eye, a lineup is sought for every one of the 1280 VPL's with the eye and the one best aligned strobe light pairs to produce the required picture on the screen. This is assured by computing line-ups for each VPL, one-by-one in order, for each eye. Of course, the same VPL is used several times for lineups with different eyes. In some cases two strobe lights may line up with an eye and a VPL. When that occurs the most closely lined-up strobe gets chosen ensuring exactly one strobe light is obtained for each eye-VPL pair.

Finding the "lined-up" strobe lights given a VPL number and an eye position:

The process starts with finding the line connecting the given VPL and the eye. Then an intersection is found between the said line and the X axis (equivalent to the intersection with the strobe array panel). The nearest strobe light (midpoint) is the best selection and can be shown to guarantee that the eye is in the constant illumination region. The numbering system for the VPL's, in this example, starts with VPL=0 and ends at 1279. The first VPL, VPL,0 is shown in FIG. 7 at the left end of the VPL panel, 4, and has an "X" location of X,lcd. The "Y" coordinate value of the LCD image panel, 4, is shown as Y,lcd. As mentioned, the strobe lights are placed along the X axis with the X value of midpoint of the first light, STR,1, set at X=0.

Given: (The following parameters are arbitrarily selected to illustrate the process)
1. Xe, Ye, the X and Y eye positions (Z dimension is not used).
2. STR,n, the position number of the strobe light to be found.
3. X,str is the X value of the exact lineup point at the strobe light panel for which the closest strobe light is sought. The midpoint of a strobe light which is closest to X,str will be the one selected.
4. Y,lcd, the Y value of the LCD screen, (=−5 in).
5. d, 0.04 inches, is the VPL spacing. Strobe light horizontal spacing is 0.115 in.
6. X,lcd=the X value at the start point of the LCD panel, is: X,lcd=0.65 (65.47-51.2)=7.135 inches.
7. VPL,n is the nth VPL the X position of which, X,vpl, is at the center of the VPL.
X,vpl=X,lcd+0.04VPL,n; the X value at the middle of the nth VPL.
(the first VPL is VPL,0).
FINDING STR,n
GIVEN Xe, Ye, AND ANY VPL,n:

$a = Xe - X,vpl$ (see FIG. 7)

$a/b = (Ye - Y,lcd)/Ye$ (similar triangles)

thus:

$b = Ye(Xe - X,lcd - 0.04VPL,n)/(Ye - Y,lcd)$ thus with the given parameters:

$b = Ye(Xe - 7.135 - 0.04VPL,n)/(Ye - 5)$ then, X,str=Xe−b $X,str = Xe - Ye(Xe - 7.135 - 0.04VPL,n)/(Ye - (-5))$ and strobe number, STR,n=X,str/strobe spacing
STR,n=nearest integer of X,str/0.115
(Strobe numbers start at 0 for X,str=0.)

Thus a table can be built finding a strobe light for every VPL aligned with a given eye. This process is then repeated for each eye filling the VPL's vs Strobe table, 15, of FIG. 2.

Figure 8:
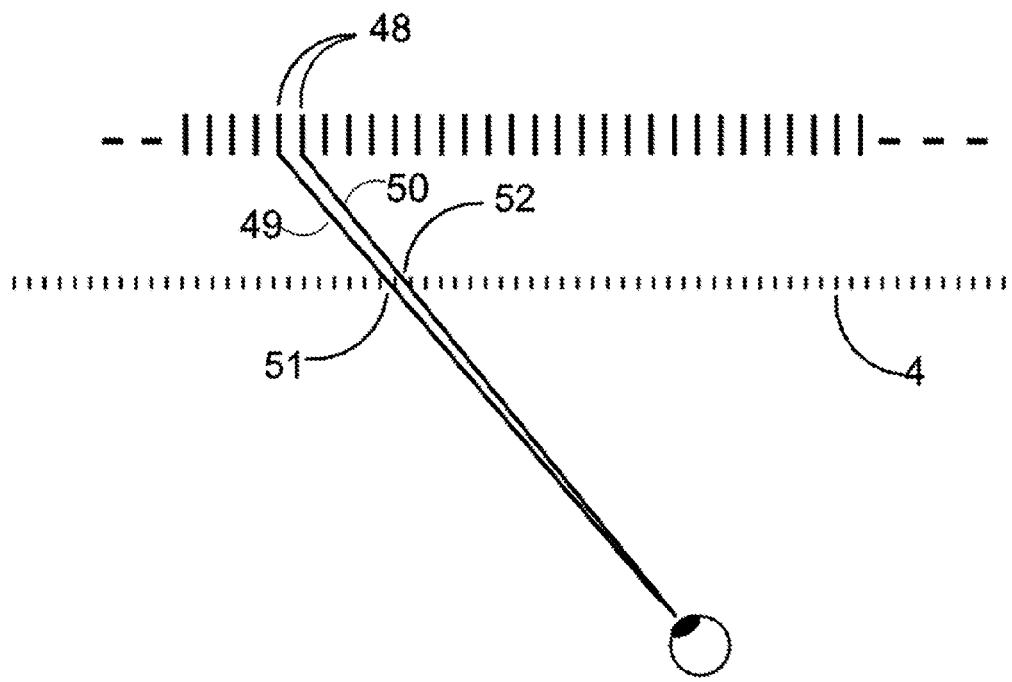
FIG. 8 shows an example of the path of light rays which are used to select pixel columns which are in line with the array lights and eyes.

FIG. 8 shows a representation of the way connection lines between a viewer's eyes and VPL's in the LCD screen are related to the selection of strobe lights. Shown here are lines, 48, representing the positions at the centers of individual strobe lamps. Lines 49 and 50 are connection lines to an eye needed to find strobe lights which are most closely aligned with the eyeball and the VPL's 51 and 52. (The VPL's are represented by the spaces between the lines shown at 4).

The following is an example of the computational method which determines which strobe light will be matched with a given VPL. Every VPL, 0 to 1279, is matched. In operation, VPL's are selected as each of the strobe lights (five at a time in the embodiment to be elaborated later) are lit. Lights will be identified by a number, from 0 to 569 in sequence from left to right With reference to both FIGS. 7 and 8:

Assume the following: (all dimensions are given in inches)
1. an eye position, Xe=80, Ye=−60
2. Y,lcd=−5
3. d=0.04 (width of VPL's)
4. X,lcd=7.13 inches, starting point of LCD panel
5. assume VPL,n, VPL numbers, are 500, 501, and 502, for which line-ups are sought.

using the expressions developed for FIG. 7:
for VPL,n=500:

$b=Ye(Xe-7.135-0.04(500))/(Ye-(-5))=57.67$, then, X,str=Xe—b=80-57.67=22.33.
STR,n=X,str/0.115=194.17, thus strobe number 194 is used for VPL,n=500.

Similarly, for VPL,n=501; STR,n=194.61 and strobe number 195 is closest, and for VPL,n=502; STR,nr=194.92 and strobe number 195 is chosen.

Thus, two VPL numbers, 501 and 502, may be selected simultaneously and illuminated by strobe number 195.

FIG. 9 shows an example of the viewing layout for the autostereoscopic TV described herein. The viewing screen is shown at 53 and the viewing region at 54.

The angles, 55 and 56 illustrate the angular limits of the possible viewing region and would be based on criteria for minimum viewing angles relative to the screen surface consistent with an acceptable amount of visual degradation. FIG. 9 is approximately scaled to the parameters of the design example used earlier: the spacing between the strobe lights, 3, and the LCD, 4, is approximately 5 inches. The screen width (LCD), is 51.2 inches. The distance from the screen to the viewing region is approximately 5 feet and the width of the viewing area is approximately 10 feet. The width of the strobe light array panel, 3, is 65.46 inches as determined geometrically from the dimensions discussed here for this particular example. Again, these numbers are illustrative only. For example, the viewing region might be preferred at a distance of 6 feet providing a width of about 12 feet. However, regardless where the optimum viewing distance is set, the adaptive approach, because eye locations are tracked, provides considerable accommodation for differing distances of viewers.

FIG. 9 also shows how the individual strobe lights only light up a fraction of the VPL's of the display and yet, cumulatively, light up every VPL on the screen for every viewer in the viewing zone. "Lighting up" here means selecting a VPL which is in-line with an eye, said VPL and a strobe light. For example, the strobe light, 58, needs only illuminate VPL's contained between lines 59 and 60. In general, for the set of parameters used here by way of example only, each strobe needs to supply light over an angle of approximately 90 degrees or less, as seen in FIG. 9. For this reason, an increase in luminous efficiency could be realized by making the inside of the strobe light enclosures reflective and then shaping them to favor directing light within the ninety degree angle toward the image panel. In addition, as mentioned earlier, a molded lenticular lens panel, consisting of an array of vertically oriented lenses, one for each strobe light could provide additional directivity for the light toward the image panel Generating a complete scene on the display screen means that at some point during each scan period, every VPL must be selected and lit for every eye position in the viewing area. Stated differently, every VPL and every eye position must be lined-up (at least) once in each scan with at least one strobe light.

It is also seen in FIG. 9 that several strobe lights may be lit simultaneously without duplicating selected VPL's with lined up eyes in any one strobing interval. For example strobe lights 58 and 61 have no common VPL's that can possibly have viewer eye line-ups. Furthermore, strobe light 61 has no common VPL's with VPL's which can be lit by the strobe lights 62, 63, and 64. The strobe lights, 62, 63, 64, 61 and 58 may therefore be lit simultaneously to provide visible VPL's to various eyes that might be lined up somewhere in the viewing area. It can be shown, geometrically, that for the viewing region used here as an example, 5 strobe lights can be programmed to be strobed simultaneously without having duplicated line-ups with eyes and VPL's.

The strobe lights, 62, 63, 64, 61, and 58 are chosen to be equally separated and they are all strobed simultaneously. Then, after 102.339 microseconds (explained below) the next group of five, to the right, are flashed and so on until after 114 such cycles every strobe light in the entire array will have been lit. Every possible eye line-up has at this point been processed and every (either left or right) eye in the viewing region has seen every image screen VPL, and thus a complete scene, completing one scan as defined earlier in ¹⁄₆₀ second.

Thus, averaging 5 strobe lights firing simultaneously means that there would 570/5, or 114 groups of five strobe lights with all 114 groups fired per image field. Each group has 102.339 microseconds allocated firing times as described later.

Although the viewing region, referenced throughout this disclosure, has been set at 5 feet as an example, this invention could be optimized for other distances. In addition, the design distance is not critical as the eye-tracking system automatically aims the lit VPL's correctly at eyes. Also, because of the use of eye-tracking, viewers may sit in more than one row if they sit at staggered positions so that they are visible to the eye-tracker.

Non viewer-adaptive systems: The disclosure herein has revolved around a viewer adaptive approach in which the positions of the viewers eyes are measured and that information is used to accommodate the screen activity to supply light rays from every VPL to every viewer's eyes. However, a non adaptive system may be made in which this is absent and to compensate this, the viewers must sit in specified locations to match the locations where complete pictures can be seen. This could be accomplished by providing, as an input into the system, a selectable set of X and Y positions from where it is desired to view the images, said inputs would then be inputted as fixed values into the Eye(s) Position Data Table as fixed viewer locations and the system will then function as described earlier but with fixed viewing positions.

System Timing and Data Tables:

The following is a description of an approach to managing the computations and data required for operation of the autostereoscopic display described herein. This embodiment is based on certain parametric assumptions expressed earlier.

The assumptions may be varied and the data management may be varied without departing from the basic scope disclosed here for this invention.

The data management for this autostereoscopic system can be separated into four functional areas:
1. Viewer eye position measurement.
2. Computer search for all vertical plane line-ups of eye positions with strobe lights and VPL's.
3. Formatting the data from 2 above into a form, the "VPL's vs STROBE" table, which makes convenient the extraction of every VPL position (VPL number) for all either right eyes or left eyes given a strobe lamp number.
4. Management of the sequence of operations needed to produce the results called for in this application. This includes;
(1) generating a system synch pulse which triggers the start of a screen scan alternating between a left eye view and a right eye view,
(2) selecting the right or left eye video image to be sent to the LCD screen for the duration of the scan interval,
   then—after a "set-up" interval during which the selected right or left video image becomes stabilized on the SLM,
(3) the first group of strobe lights (5 lights) is selected to be strobed,
(4) using the "VPL's vs STROBE" table to provide the VPL number of every VPL lineup with the selected strobe lights and every eye, (either right or left based on the alternating selection made in (1) above), and then selecting these VPL's,
(5) flashing the strobe lights in the group selected in (3) above,
(6) de-selecting the previously selected VPL's,
(7) repeating steps (3) to (6) selecting the next group (in step 3) of strobe lights until all 164 groups have been processed,
(8) returning to (1) and alternate the left/right choice and repeat all steps.

The following explains the data tables to be constructed to facilitate the above processing procedure.

1. Eye Position Data

The measurements used to produce this data table are run continuously in the background keeping eye positions current.

The X and Y position data for every right and left eye is stored here.

| EYE POSITION DATA TABLE | |
|---|---|
| All Left Eyes: | |
| X,L1 | Y,L1 |
| X,L2 | Y,L2 |
| X,L3 | Y,L3 |
| — | |
| — | |
| All Right Eyes | |
| X,R1 | Y,R1 |
| X,R2 | Y,R2 |
| X,R3 | Y,R3 |
| — | |
| — | |

2. Strobe Light/Eye Lineups

This table holds the complete list of all lineups of every eye in the viewing region with each strobe light and all VPL's.

The results based on the method for finding lineups between VPL's, strobe lights and eyes as described earlier are stored here in the following format:

| STROBE LIGHT/EYE LINEUPS | | |
|---|---|---|
| | VPL numbers | STROBE numbers |
| ALL LEFT EYE/STROBES LINEUPS | | |
| LEFT EYE 1: | VPL,0 | STROBE(L1, VPL,0) |
| | VPL,1 | STROBE(L1, VPL,1) |
| | VPL,2 | — |
| | VPL,3 | — |
| | — | — |
| | VPL,1279 | STROBE(L1, VPL,1279) |
| LEFT EYE 2 | VPL,0 | STROBE(L2, VPL,0) |
| | VPL,1 | STROBE(L2, VPL,1) |
| | VPL,1279 | STROBE(L2, VPL,1279) |
| LEFT EYE 3 | — | — |
| | — | — |
| CONTINUE WITH | | |
| ALL LEFT EYES AS ABOVE | | |
| ALL RIGHT EYE/STROBES LINEUPS | | |
| RIGHT EYE 1 | VPL,0 | STROBE(R1, VPL,0) |
| | VPL,1 | STROBE(R1, VPL,1) |
| | — | — |
| | VPL,1279 | STROBE(R1, VPL,1279) |
| RIGHT EYE 2 | VPL,0 | STROBE(R2, VPL,0) |
| | — | — |
| CONTINUE WITH ALL | | |
| RIGHT EYE LINEUPS | | |

3. Data Re-Arranged:
VPLnumbers vs STROBEnumber LINEUP TABLE

The data shown here explains the "VPL's vs STROBE" unit, 15, in FIG. 2.

The data in (2) above is re-arranged and listed according to strobe lights, 0 through 569. Thus as strobe lights (in groups of five, in one example), are selected to be fired, this table is accessed to select all VPL's for the five strobes set to be simultaneously fired.

VPL's vs STROBE Number Lineup Table

| VPL's vs STROBE number lineup table | |
|---|---|
| ALL LEFT EYES: | |
| lined up | |
| VPL numbers vs STROBE number | |
| | lined-up VPL's |
| STROBE 1 | VPL,n1, VPL,n2, VPL,n3, — |
| STROBE 2 | VPL,n-, VPL,n-, VPL,n- — |
| STROBE 3 | — |
| STROBE 4 | — |
| — | — |
| — | — |
| ALL RIGHT EYES: | |
| lined up | |
| VPL numbers vs STROBE number | |
| STROBE 1 through 820 | |
| Same as for left eyes, | |

4. System Timing Sequence

Presented here is an example of data format for the display system timing based on the embodiment shown in FIG. 9. Other configurations based on the basic approaches described herein, and which may be obvious to those skilled in the art, would lead to similar system sequence control while remaining within the scope of this invention.

Based on FIG. 9:
Strobe group 1 is strobe numbers 1, 115, 229, 343, 457
strobe group 2 is strobe numbers 2, 116, 230, 344, 458 Etc., Etc.

(strobe numbers increase by one each time cycle until reaching strobe group 114)

The entire time for the 114 groups, 1/60 second, is defined as one scan interval For illustration only, it is assumed that a right or left video signal for each scene is started at time=0 microseconds and requires 5000 microseconds for the SLM scene to stabilize. After that, strobe lights are triggered to flash for 114 cycles reaching 1/60 second. Within each cycle, we assume, for illustration of the method, that strobe lights light for 0.011666 sec/114=102.339 microseconds.

The selected VPL's below are fetched from the "VPL numbers vs STROBE number" table in 3 above.

| SYSTEM TIMING SEQUENCE | | |
|---|---|---|
| SYSTEM TIMING LEFT EYES ONLY | | |
| TIME after scan start microseconds | STROBE GROUP | action |
| 0 | — | start display of left eye scene at SLM |
| 5000 | 1 | select every VPL aligned with every LEFT-EYE and every group 1 strobe (strobe nos: 1,65,329,493,657) flash strobe group 1 then de-select all VPL's |
| 5071.11 | 2 | same as above for group 2 strobes |
| 5142.28 | 3 | same as above for group 3 strobes |
| 5213.41 | 4 | same as above for group 4 strobes |
| 5284.55 | 5 | same as above for group 5 strobes |
| — | — | |
| | continue until group 114 is reached | |
| 165964.307 16667 (1/60th sec) | 114 | (strobe nos. 113, 227, 341, 455, 569) end of left eyes scan go to right eyes scan |
| SYSTEM TIMING RIGHT EYES ONLY | | |
| Sequence format for right eyes same as above from 0 to 16667 microseconds, but substitute right eye data throughout. | | |

The data management approach described above is based on selecting strobe lights (in groups) for lighting and then selecting the VPL's which are lined up with the selected strobe lights and eyes. It should be noted that an alternative approach would be to first select VPL's, in some logical order, and then to select the appropriate lined-up strobe lights for firing. Both approaches are approximately equivalent although selecting the strobes first uses less required radiant power because the lamps are fired just once during each image field period.

Additionally, the data management described above, and the grouping of the data classes plus the sequence of the computations may be considerably varied without departing from the spirit and scope of this invention. The spirit and scope of this invention is based primarily on the array of selectable strobe lights, a transmissive image panel in which one or several pixel-wide columns are selected and made transmissive when aligned with selected strobe lights and with individual viewing eyes.

What is claimed is:

1. An autostereoscopic display system comprised in part of an array of vertically oriented, narrow light source strobe lights, and a transparent image panel, or a spatial light modulator, (SLM), disposed between the array of strobe lights and a viewing region containing one or more viewers, the display system including:
    a) means for selecting and causing to briefly emit light, one or more of the light sources, in the direction of the SLM panel;
    b) means for tracking a position of the left eye and the right eye, respectively of each of the one or more viewers;
    c) means for selecting, in response to the position of each left eye and right eye of each of the one or more viewers, and to positions of a currently illuminated one of the strobe lights the single and separate full height vertical picture lines (VPL) aligned with the light and eye positions, for transmissivity, in the SLM, of width of one or more pixels, while the remainder of the SLM remains dark, the aligned VPL chosen to be the closest aligned to the respective light source in instances of multiple alignment, in order to project individually selected vertically oriented sheets of light through the selected VPL's of the SLM, which are coplanar with the selected VPL's and the selected one of the strobe lights, toward an eye in the viewing region whereby said sheet of light rays is sufficiently narrow so as to aim toward and enter a left eye or a right eye of the one or more viewers but not both the left eye and the right eye of each of the one or more viewers concurrently, and to render visible the entire height of the selected VPL to the left eye or the right eye; and
    d) means for repeatedly cycling through the briefly lit light sources and respective selected VPL's so as to cycle through all the strobe lights and all the VPLs, thereby cycling through one entire image for the left eye or the right eye in succession resulting in an auto stereoscopic view.

2. The autostereoscopic display system as described in claim 1, further comprising means for computing, using the positions of the eyes located in the viewing region as obtained from the means for eye-tracking, to find one or more of the strobe lights which are aligned with VPL's and selected eyes, wherein when the aligned one or more of the strobe lights is flashed, it renders visible an entire VPL in the SLM to the selected eye within the vertically oriented sheet of light rays issuing from the aligned VPL, producing for the selected eye a full height view of the aligned VPL.

3. The autostereoscopic display system as claimed in claim 2 further comprising means for eye tracking arranged to track the locations of each of the eyes in the viewing area together with stationary reflective markers fixed to stationary locations in the viewing region for alignment of the means for eye tracking to maintain the required precision for tracking said eye locations, and to use said eye tracking information together with knowledge of the positions of the vertical picture columns on the SLM and with knowledge of the positions of the individual strobe lights to create a data table of numbers which identify each VPL which is in the same vertical plane in common with a viewing eye and a strobe light.

4. The autostereoscopic display system as claimed in claim 2, wherein one or more left and right eye positions may be set at predetermined locations in the viewing area by programming the autostereoscopic display system to direct views of the correct vertical picture columns into each of the pairs of right/left predetermined locations, in the same manner as measured eye locations to produce the required autostereoscopic views.

5. The autostereoscopic display system as described in claim 1, wherein the array of strobe lights in number are comparable to the number of horizontal resolution elements, and which; are narrow vertical luminous columns of light from gas tube sources, LED sources, or any type of light source, or have one or more vertical slit openings in enclosures containing light sources and for which the horizontal dimensions of the light sources are comparable in size to one or several screen pixels on the image panel, and the heights of the light sources are generally greater than the height of the SLM panel.

6. The autostereoscopic display system as described in claim 5, wherein every one of the strobe lights, when selected, is arranged to illuminate an entire vertical length of several selected single-pixel-wide vertical picture lines of the SLM.

7. The autostereoscopic display system as claimed in claim 6 wherein the strobe light array includes a dispersion panel to provide greater uniformity in vertically spreading the light from the strobe light array.

8. The autostereoscopic display system as claimed in claim 5 wherein a combined width of the light slits or openings associated with a strobe light in the strobe light array, or widths of single illumination elements, when combined with the widths of the vertical picture lines, VPL's, of the SLM image panel, are so selected as to project zones of illumination of widths less than an average inter-ocular distance so as to cause the light from VPL's to enter either the selected right eyes or left eye sonly but not both right eyes and left eyes.

9. The autostereoscopic display system as claimed in claim 1, in which individual VPL's, which are in-line with selected strobe lights and selected eyes, are placed into a transparent, or transmissive, state, said selected VPL's being the only VPL's allowing light from the selected strobe lights to pass through the SLM panel to enter selected eyes in the viewing region.

10. The autostereoscopic display system as claimed in claim 9 further comprising a second SLM comprising an SLM-shutter panel in close contact with the SLM panel, and wherein said SLM-shutter panel is electronically controlled to produce narrow vertical strips of clear regions while the remainder of the SLM shutter panel remains opaque to achieve selection of the properly aligned vertical pixel columns in the SLM panel, said second SLM being an alternative to generating opaque and clear vertical stripes in the first SLM while the first SLM maintains a steady image during the field time.

11. The autostereoscopic display system as claimed in claim 1, in which the displayed images are inputted into the system as stereoscopic video signals with means provided for separating the incoming video signals into separate right-eye view and left-eye view images wherein the video stream is reformatted to display right and left images to the appropriate eyes providing a satisfactory autostereoscopic image.

12. The autostereoscopic display system as claimed in claim 1, wherein monoscopic viewing is obtained by allowing all pixels in the screen to be transmissive and to flash all the strobe lights either together or in some sequence, at some desired frame rate.

* * * * *